US008189544B2

(12) United States Patent
McCann et al.

(10) Patent No.: US 8,189,544 B2
(45) Date of Patent: May 29, 2012

(54) METHOD OF CREATING SECURITY ASSOCIATIONS IN MOBILE IP NETWORKS

(75) Inventors: Peter James McCann, Naperville, IL (US); Semyon B. Mizikovsky, Morganville, NJ (US); Ganapathy Subramanian Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 935 days.

(21) Appl. No.: 11/474,591

(22) Filed: Jun. 26, 2006

(65) Prior Publication Data

US 2007/0297377 A1    Dec. 27, 2007

(51) Int. Cl.
*H04W 4/00* (2009.01)
(52) U.S. Cl. ............. 370/338; 370/311; 370/395.3; 370/395.43; 455/433; 709/230; 709/229; 713/150; 713/168; 380/270
(58) Field of Classification Search .......... 370/331, 370/401, 395.3, 395.54, 338; 455/433; 709/230, 709/229; 713/150, 168; 380/270
See application file for complete search history.

(56) References Cited

U.S. PATENT DOCUMENTS

| | | | | |
|---|---|---|---|---|
| 5,661,806 | A * | 8/1997 | Nevoux et al. | 380/247 |
| 6,351,536 | B1 * | 2/2002 | Sasaki | 380/44 |
| 7,158,777 | B2 * | 1/2007 | Lee et al. | 455/411 |
| 2002/0133716 | A1 * | 9/2002 | Harif | 713/201 |
| 2004/0203783 | A1 * | 10/2004 | Wu et al. | 455/436 |
| 2004/0240412 | A1 * | 12/2004 | Winget | 370/331 |
| 2005/0141718 | A1 * | 6/2005 | Yu et al. | 380/277 |
| 2006/0205388 | A1 * | 9/2006 | Semple et al. | 455/411 |

FOREIGN PATENT DOCUMENTS

WO PCT/US2007/014419    3/2008

OTHER PUBLICATIONS

K. Leung, G. Dommety, P. Yegani, Cisco Systems, "Mobility Management Using Proxy Mobile IPv4; draft-leung-mip4-proxy-mode-00.txt", IETF Standard-Working-Draft, Internet Engineering Task Force, IETF, CH, Feb. 26, 2006, pp. 1-16.

(Continued)

*Primary Examiner* — Nimesh Patel
(74) *Attorney, Agent, or Firm* — Wolff & Samson PC

(57) ABSTRACT

A key distribution scheme is provided, which is useful for establishing, distributing, and maintaining security associations in a Mobile IP network. An authentication server performs an initial validation of a new session and generates a root key which it delivers to the initial access gateway and to the home agent. The initial access gateway and the home agent each independently compute a derivative key available only to themselves. The initial access gateway, acting as proxy for the mobile station, uses the derivative key to sign the Mobile IP registration or binding update transactions, and sends the signed registration or binding update to the home agent for validation. Once the session is established between the mobile station and the home agent, the access gateways act as proxies on behalf of the mobile station to maintain the session mobility. In handoff, the new access gateway acquires the root key as part of the transferred session context. The new access gateway, acting as proxy for the mobile station, computes a new derivative key from the root key and uses it to sign a binding update.

3 Claims, 7 Drawing Sheets

OTHER PUBLICATIONS

Charles E. Perkins, Nokia Research Center, Pat R. Calhoun, Sun Microsystems Laboratories, "AAA Registration Keys for Mobile IP; draft-ietf-mobileip-aaa-key-03.txt;", IETF Standard-Working-draft, Internet Engineering Task Force, IETF, CH, vol. Mobileip, No. 3, Jan. 28, 2001, pp. 1-10.

Madjid Nakhjiri Narayanan Venkitaraman, Motorola Labs, "EAP based Proxy Mobile IP key bootstrapping for WiMAX; draft-nakhjiri-pmip-key-01.txt", IETF Standard-Working-Draft, Internet Engineering Task Force, IETF, CH, No. 1, Jan. 2006, pp. 1-11.

K. Leung, G. Dommety, P. Yegani, Cisco Systems, K. Chowdhury, Starent Networks, "Mobility Management Using Proxy Mobile IPv4; draft-leung-mip4-proxy-mode-01.txt", IETF Standard-Working-Draft, Internet Engineering Task Force, IETF, CH, No. 1, Jun. 25, 2006, pp. 1-16.

* cited by examiner

METHOD OF CREATING SECURITY ASSOCIATIONS IN MOBILE IP NETWORKS

FIELD OF THE INVENTION

The invention relates to communication methods and protocols in networks that support wireless communication of Internet Protocol (IP) data.

ART BACKGROUND

There has been growing interest in communication networks of the kind that will permit a mobile user to engage in an Internet Protocol (IP) communication session, even while changing from one wireless access network to another. In known mobile IP networks, the transfer of an active session from one access network to another will typically involve a re-registration carried out between the mobile terminal and the target access network. One outcome of the re-registration is that the mobile terminal registers a care-of address with its home agent, and the home agent creates a binding between the mobile terminal's home address and its care-of address. (A binding is an established association between network nodes for the duration of a session.) As a consequence, when packets addressed to the home address arrive at the home network, the home agent can redirect them to a foreign agent that is currently serving the mobile terminal.

If the mobile terminal is configured for Simple IP, the transfer of the active session will be effectuated through lower layer inter-network signaling. Regardless of whether the mobile terminal is configured for Simple IP or for Mobile IP, the transfer will incur overhead in the form of signaling over the air interface and in the network backhaul, typically including interrogations directed to an authentication server or the like.

In mobile IP networks that have a hierarchical network architecture, it is typical for relatively many cells to connect to a wireline packet switched network through a single packet data serving node (PDSN). Under such conditions, it may be tolerable for handoffs to incur signaling overhead of the kind discussed above.

However, other mobile IP networks are envisaged, in which the architecture is flat. That is, access nodes may include the functions not only of a base station transceiver, but also those of a Radio Network Controller (RNC) and even those of an Access Gateway to the packet switched network. Handoffs of a mobile user terminal will typically be much more frequent for such an architecture, because the geographical coverage of each Access Gateway (or the equivalent) is typically much smaller than for the hierarchical architecture. As a consequence, signaling overhead associated with handoffs will be relatively high. One result is that the ability of the network to perform fast handoffs may be impaired.

There have been proposals to solve this problem by applying the principles of Proxy Mobile IP. Proxy Mobile IP is an approach in which the re-registration of the mobile user terminal with the target access network is not performed directly by the mobile user terminal, but instead is performed by a proxy located in a serving access network, and acting on the terminal's behalf. Such an approach may reduce the signaling overhead that is required.

The use of a proxy, however, raises concerns related to network security. That is, an entity claiming to be a proxy may in fact be an interloper, or a legitimate proxy may be opening the door to a fraudulent transaction. To remove such concerns, it is advantageous to establish security associations among the mobile terminal's home agent and the access gateway associated with each access network that serves the mobile terminal. There has been a need for practical methods of establishing, distributing, and maintaining such security associations.

SUMMARY OF THE INVENTION

We have developed new methods of establishing, distributing, and maintaining security associations in a mobile IP network. For example, according to a key distribution scheme that we have developed, the mobile user terminal contacts an initial access gateway and initiates the registration of a new session with a home agent. An authentication server performs an initial validation of the new session and generates a root key which it delivers to the initial access gateway and to the home agent. The initial access gateway computes a derivative key. The derivative key is computed from inputs which include the root key and identification numbers of the initial access gateway and the home agent. Thus, the derivative key is unique to a pair consisting of a particular access gateway and a particular home agent. The home agent, which also possesses the input information, likewise computes the derivative key. The initial access gateway uses the derivative key to sign the registration, and sends the signed registration to the home agent. The home agent determines that the registration was signed with a valid derivative key, and in response, validates the registration.

When the mobile terminal moves on to a subsequent access gateway, the new access gateway requests the session context from the previous access gateway. The previous access gateway provides the session context, including the root key. The new access gateway uses the root key as input to compute a new derivative key. The new access gateway generates a binding update, signs it using the new derivative key, and sends the signed binding update to the home agent. The home agent confirms that the binding update was signed with a valid derivative key, and in response, it validates the binding update.

DETAILED DESCRIPTION

Figure 1:
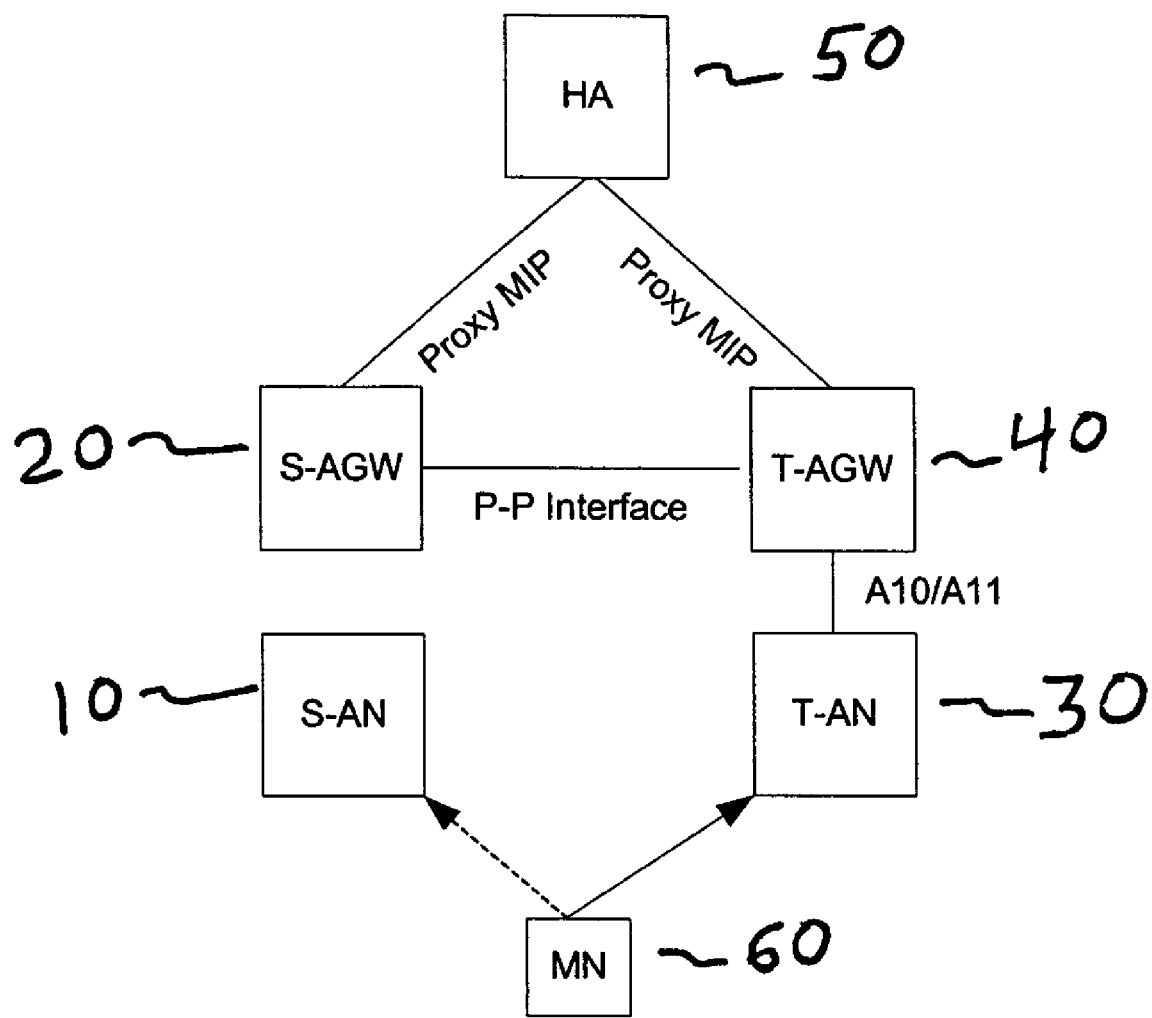
FIG. 1 is a simplified architectural diagram of an Evolved High Rate Packet Data (HRPD) network which is one example of a network that may support mobile IP communication.

FIG. 1 shows a portion of a mobile IP network, including Access Node (AN) 10 together with its associated Access Gateway (AGW) 20, and AN 30 together with its associated AGW 40. By way of communication protocols relating to Proxy Mobile IP (Proxy MIP), AGW 20 and AGW 40 communicate with Home Agent (HA) 50. HA 50 is the Home Agent for Mobile Node (MN) 60. Each Access Node communicates with its associated Access Gateway through an interface such as the A10/A11 interface shown between AN 30 and AGW 40. The A10 portion of such an interface carries data, and the A11 portion carries control signals. An A10/A11 interface may also be referred to as an R-P interface. The AGWs intercommunicate via a P-P interface, as also shown in the figure. The use of such an interface is conventional and need not be described here in detail.

As seen in the figure, MN 60 is both a Mobile Node and a Mobile Station. As explained below, a proxy may assume the role of mobile Node on behalf of a given Mobile Station, for example when carrying out a Mobile IP re-registration. To avoid confusion, we will use the term "Mobile Station (MS)" to specifically denote the user terminal, as opposed to the proxy that may be acting on its behalf.

In the figure, MN 60 is shown making the transition from AN 10 to AN 30. AN 10 is the current Serving Access Node (S-AN), and AN 30 is the current Target Access Node (T-AN), which will become the new S-AN. Correspondingly, AGW 20 is labeled in the figure as a Serving Access Gateway (S-AGW), and AGW 40 is labeled as a Target Access Gateway (T-AGW).

Mobile IP protocols are intended to make it possible for mobile devices to maintain their permanent IP addresses while moving from one network to another. Mobile IPv4 is described in RFC 3344 of the Internet Engineering Task Force (IETF). Mobile IPv6 is one of several proposed enhancements to Mobile IP for greater security and efficiency.

The set of protocols that apply in a Proxy MIP network that complies with Mobile IPv4 will be referred to here as Proxy Mobile IPv4. Likewise, the set of protocols that apply in a Proxy MIP network that complies with Mobile IPv6 will be referred to here as Proxy Mobile IPv6.

Mobile handoff procedures, for example for handing off MN 60 from AN 10 to AN 30, are executed by means of link-layer signaling at Layer 2, which is a protocol layer lying below the Mobile IP protocol layer. The handoff procedures may include authentication of MN 60 to the target AN 30. Such procedures are conventional and need not be described here in detail. As will be seen, however, MN 60 (more specifically, Mobile Station 60) will authenticate itself to HA 50 initially, i.e., when the new Mobile IP session is initiated. When MS 60 transitions to a new AN, such as AN 30, the new AN will become a client of Mobile IP authentication and will authenticate to HA 50 on behalf of MS 60.

Figure 2:
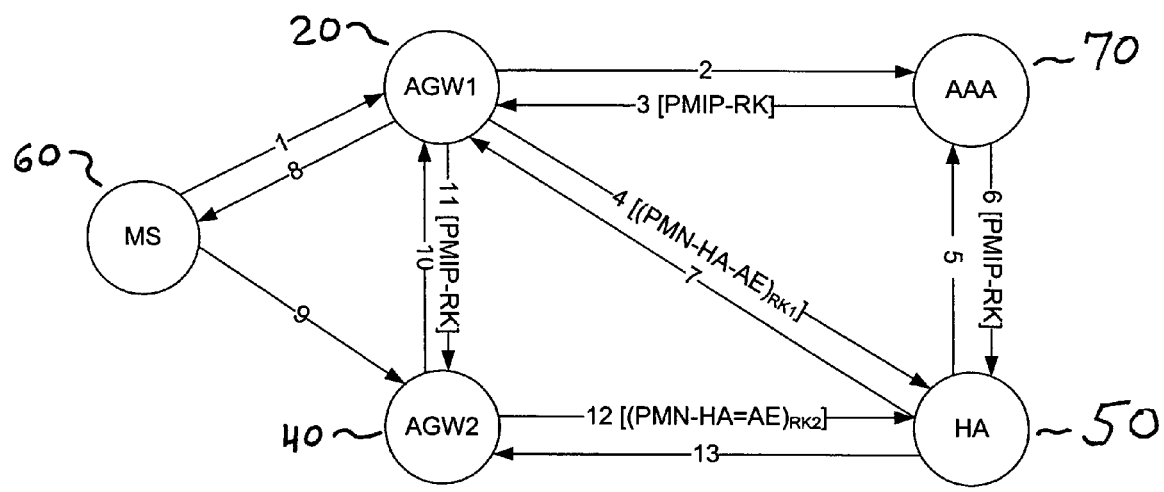
FIG. 2 is a simplified flow diagram of a basic key distribution scheme for a mobile IP network using proxies for registration and for binding updates.

Reference is now made to FIG. 2, in which those elements that correspond to elements of FIG. 1 are called out by corresponding reference numerals. In particular, MS 60 corresponds to MN 60 of FIG. 1, and AGW 20, which is labeled "AGW1", and AGW 40, which is labeled "AGW2", correspond to the like-numbered elements of FIG. 1. A further element, first introduced in FIG. 2, is Authentication Server 70. In specific embodiments of the invention, Authentication Server 70 is an Authorization, Authentication, and Accounting (AAA) server, which is well known in the art. Accordingly, the abbreviation "AAA" will be used below to denote any Authentication Server useful in this regard.

In order to make the Proxy MIP procedures secure, it is advantageous to distribute cryptographic keys among the participating Access Gateways and the Home Agent. An example of one possible key distribution scheme will now be described with further reference to FIG. 2. Each of the numbered arrows in the figure corresponds to a like-numbered step in the procedure to be described below.

In brief, MS 60 and AGW1 20 register a new Mobile IP session and initially validate it with AAA 70. In response, AAA 70 generates and returns a specially generated key, denoted PMIP-HA-RK, that can be used as the Root Key for Proxy MIP procedures throughout the session. HA 50 also receives this Root Key, and keeps it for as long as the session is registered with HA 50.

Each serving AGW, in turn, computes a derivative of the root key, such that the resulting derivative key is unique to each specific AGW-HA pair. The pertinent derivative is also computed by the HA whenever a new AGW is brought into the session.

The derivative key is denoted PMN-HA. Each Proxy MIP registration, re-registration, or Binding Update (BU) is signed using PMN-HA, and the signature is used for validation by the HA.

Procedure 1: Basic Procedure for Key Distribution

1. MS 60 accesses AGW1 20. The Mobile Station may, for example, be configured for Simple IP, or for Mobile IPv.4 with no pre-provisioned HA Address. If MS 60 is configured for Simple IP, CHAP is executed between AGW1 20 and MS 60. CHAP is the Challenge Handshake Authentication Protocol defined in RFC 1994 and used by Point to Point Protocol (PPP) servers to validate the identities of remote clients.

2. AGW1 20 formats a RADIUS Access Request (AcREQ). RADIUS (Remote Authentication Dial-In User Service) is an authentication protocol defined in RFC 2865 and RFC 2866 and used for network access, IP mobility, and other such applications. The Access Request includes within it a (simulated) MIPv.4 Registration Request (RRQ), using either CHAP parameters (for a Mobile Station configured for SimpleIP) or RRQ MN-HA-AE (or MN-AAA-AE). The MN-HA-AE is an Authentication Extension (AE). Typically, an AE is an expression derived from a message using a key or other secret shared between the sending and receiving entities. The AE is appended to the message as a signature to authenticate the sending entity to the receiving entity.

3. AAA 70 validates the AE and returns to AGW1 20 a randomly generated Proxy MIP Root Key, denoted PMIP-RK. AAA 70 also returns the HA Address, denoted HA-ID.

4. AGW1 20 generates a derivative key, denoted RK1. RK1 mis referred to as a PMN-HA key because it is used specifically to authenticate messages between proxies in the Proxy MIP network and the HA. RK1 is generated according to RK1=prf(PMIP-RK, AGW1-ID, HA-ID), where prf denotes a pseudo-random function, and AGW1-ID and HA-ID are the addresses, respectively, of AGW1 20 and HA 50.

AGW1 then generates a binding update and sends it with a signature computed using RK1. More specifically, if AGW 1 and the HA are configured for Mobile IPv4, AGW1 will request the binding update by sending a Registration Request (RRQ) message signed with an Authentication Extension (AE) computed using RK1. The return message will be a Registration Response (RRP). On the other hand, if AGW1 and the HA are configured for Mobile IPv6, AGW1 will request the binding update by sending a Binding Update (BU) message signed with an Authentication Option (AO) computed using RK1.

It is noteworthy in this regard that conventionally, the Mobile Station would initiate the binding update. Therefore, it is a departure from methods of the prior art for the AGW (acting as proxy) to initiate the binding update. Moreover, a conventional AE (or other signature) at this step would be computed using a symmetric key established by prearrangement between the Mobile Node and the Home Agent. Thus, using RK1 to compute the AE represents a further departure from methods of the prior art.

5. HA 50 requests the Root Key PMIP-RK from AAA 70.
6. AAA 70 returns the PMIP-RK to HA 50.
7. HA 50 validates the AE appended to the Binding Update (BU). If validation is successful, the HA returns a BA message to AGW1, indicating that the BU was accepted. A BA message signifies Binding Acknowledgement in protocols such as Mobile IPv6.
8. The Access Serving Network (ASN), which as shown includes AGW1 20, sends an Address Assignment or MIPv.4 Registration Reply (RRP) to MS 60. It is noteworthy in this regard that if the mobile terminal is configured for Simple IP, the IP Address is assigned via the Address Assignment message. On the other hand, if the mobile terminal is configured for MIPv.4, the IP Address associated with the HA is assigned. The assigned address in this second case is referred to as the Home Address of the MN, or the HoA. This is done to insure that all egress traffic to the mobile that was addressed to HoA will reach the HA first, and will then be encapsulated with the care-of address (CoA) by the HA and sent to the Foreign Agent. The Foreign Agent will then strip the CoA and deliver the traffic to the MS based on the HoA.
9. MS 60 moves to AGW2 40.
10. AGW2 40 requests the session context from AGW1 20. The session context will typically include the Root Key, as well as session-related information such as the mobile ID, an identification of the various service flows and a QoS level for each flow, the address of the HA, and the IP address of the mobile station.
11. AGW1 20 returns the context to AGW2 40. The context, as returned to AGW2 40, includes the Root Key PMIP-RK.
12. AGW2 40 generates a further PMN-HA key, denoted RK2, according to RK2=prf(PMIP-RK, AGW2-ID, HA-ID). AGW2 40 generates and sends the MIPv.6 BU using RK2 to compute the Authentication Extension.
13. HA 50 validates the AE appended to the Binding Update (BU) and returns a BA message to AGW2 40.

Below, we will describe a Proxy MIP procedure for initial establishment of a session in the case that the Mobile Station is configured for Simple IP. It is noteworthy in this regard that for a Simple IP session, Proxy Mobile IP is used both at initial establishment and during a fast handoff between AGWs to set up tunnels between the Target AGW and the HA. For a Mobile IP session, on the other hand, Proxy Mobile IP is used only during a fast handoff between AGWs to set up tunnels between the Target AGW and the HA.

Below, we will also describe a Proxy MIP procedure for fast handoff using Proxy Mobile IPv6.

It should be noted in this regard that the choice between Proxy Mobile IPv4 and Proxy Mobile IPv6 is independent of the version of the Simple IP or Client Mobile IP session that may be running during the initialization of the session.

Figure 3:
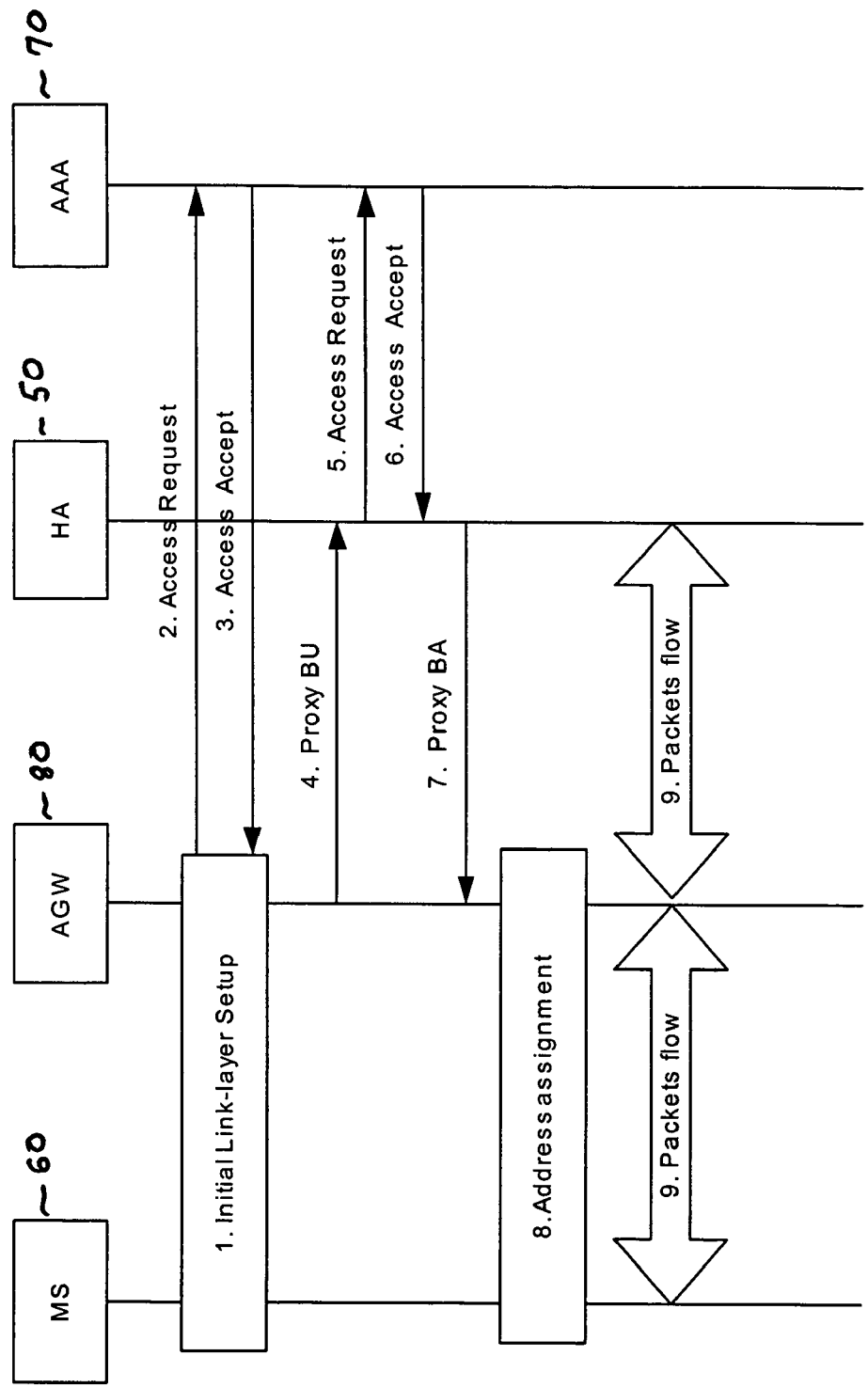
FIG. 3 is a diagram of the signaling messages used in an example procedure for initial establishment of a session in Proxy Mobile IPv6 when the mobile station is configured for Simple IP.

With reference to FIG. 3, we turn now to a method for a Mobile Station configured for Simple IP to establish a session with the AGW and the HA in accordance with Proxy Mobile IPv6. In the figure, HA 50, MS 60, and AAA 70 correspond to the like-numbered elements of the preceding figures. AGW 80 of FIG. 3 represents the initial serving AGW, i.e., the AGW that is serving the mobile station when a new session is to be established. Each of the sequentially numbered steps listed below corresponds to a like-numbered block or arrow in the figure.

Procedure 2: Proxy Mobile IPv6 Initial Establishment for Simple IP Mobile Station 1. The initial serving AGW 80 performs link layer establishment with the MS 60. For example, if the link layer is to be established using the PPP protocol, the Link Control Protocol (LCP) will effectuate the establishment, configuration, and testing of the data-link connection, and CHAP will be used to validate identity of the client mobile station. If MS 60 is configured for IPv6, IPv6CP can run at this point to negotiate unique interface identifiers for the MS and the AGW. However, it should be noted that if MS 60 is configured for Simple IPv4, the IPCP Configure-NAK message from the AGW will be delayed until after step 8.
2. AGW 80 makes a RADIUS Access-Request to check the CHAP response. The AGW indicates that it is capable of Proxy Mobile IP operation.
3. The RADIUS server (represented in the figure by AAA 70) returns an Access-Accept message containing PMN-HA-RK, which is a root key to be used for proxy-based authentication between the mobile node and HA 50 ("Proxy MN-HA Authentication"), and further containing an address of the HA to be used for the session.
4. AGW 80 sends a Proxy Binding Update to the HA address. The BU is authenticated using the MN-HA Authentication Option. The authentication uses an AGW-specific key, PMN-HA, derived from the root key PMN-HA-RK that was returned in the Access-Accept message. The Proxy BU also contains an indication of whether the MS is requesting a Simple IPv4 address or a Simple IPv6 address.
5. HA 50 checks the authentication option extension by sending a RADIUS Access-Request to AAA 70.
6. The RADIUS server (represented in the figure by AAA 70) responds with an Access-Accept message and also returns the Proxy MN-HA root key, PMN-HA-RK. This root key will be required by the HA to compute the AGW-specific key, PMN-HA. The computed PMN-HA key will be used by the HA to validate the MN-HA Authentication Option received in the BU.
7. HA 50 responds with a Proxy Binding Acknowledgement. For an IPv6 session, the Proxy Binding Acknowledgement contains an Assigned Home Address option. For a Simple IPv4 session, the Proxy Binding Acknowledgement contains the Assigned Home IPv4 Address option.
8. For an IPv6 session, AGW 80 generates a router advertisement in accordance with the attributes returned from HA 50. The MS then uses stateless address auto configuration to generate an address on the advertised prefix. For Simple IPv4, the address assignment during IPCP completes.
9. Packets flow between MS 60 and HA 50 via AGW 80.

Figure 4:
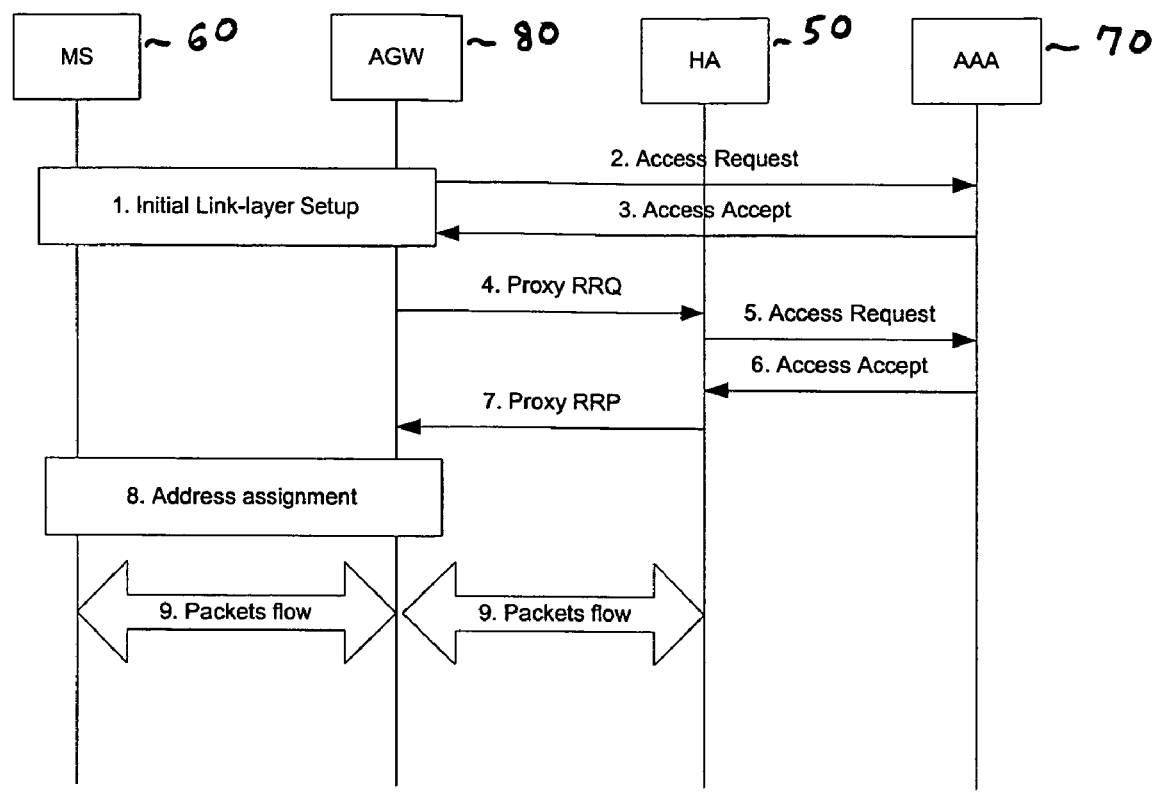
FIG. 4 is a diagram of the signaling messages used in an example procedure for initial establishment of a session in Proxy Mobile IPv4 when the mobile station is configured for Simple IP.

With reference to FIG. 4, we turn now to a method for a Mobile Station configured for Simple IP to establish a session with the AGW and the HA in accordance with Proxy Mobile IPv4. In the figure, HA 50, MS 60, and AAA 70 correspond to the like-numbered elements of the preceding figures. Each of the sequentially numbered steps listed below corresponds to a like-numbered block or arrow in the figure.

Procedure 3: Proxy Mobile IPv4 Initial Establishment for Simple IP Mobile Station 1-3. As described in Procedure 2.

4. The AGW sends a Proxy Registration Request (RRQ) to the HA address. The RRQ is authenticated using the MN-HA Authentication Extension using the AGW-specific key, PMN-HA, derived from the PMN-HA-RK key returned in the Access-Accept. The Proxy RRQ also contains an indication of whether the MS is requesting a Simple IPv4 or Simple IPv6 address.

5. The HA checks the authentication extension by sending a RADIUS Access-Request.

6. The RADIUS server responds with Access-Accept and also returns the Proxy MN-HA root key. This key, PMN-HA-RK, is required by the HA to compute the AGW-specific key, PMN-HA. The computed PMN-HA key will be used by the HA to validate the MN-HA Authentication Extension received in the RRQ.

7-9. As described in Procedure 2.

Figure 5:
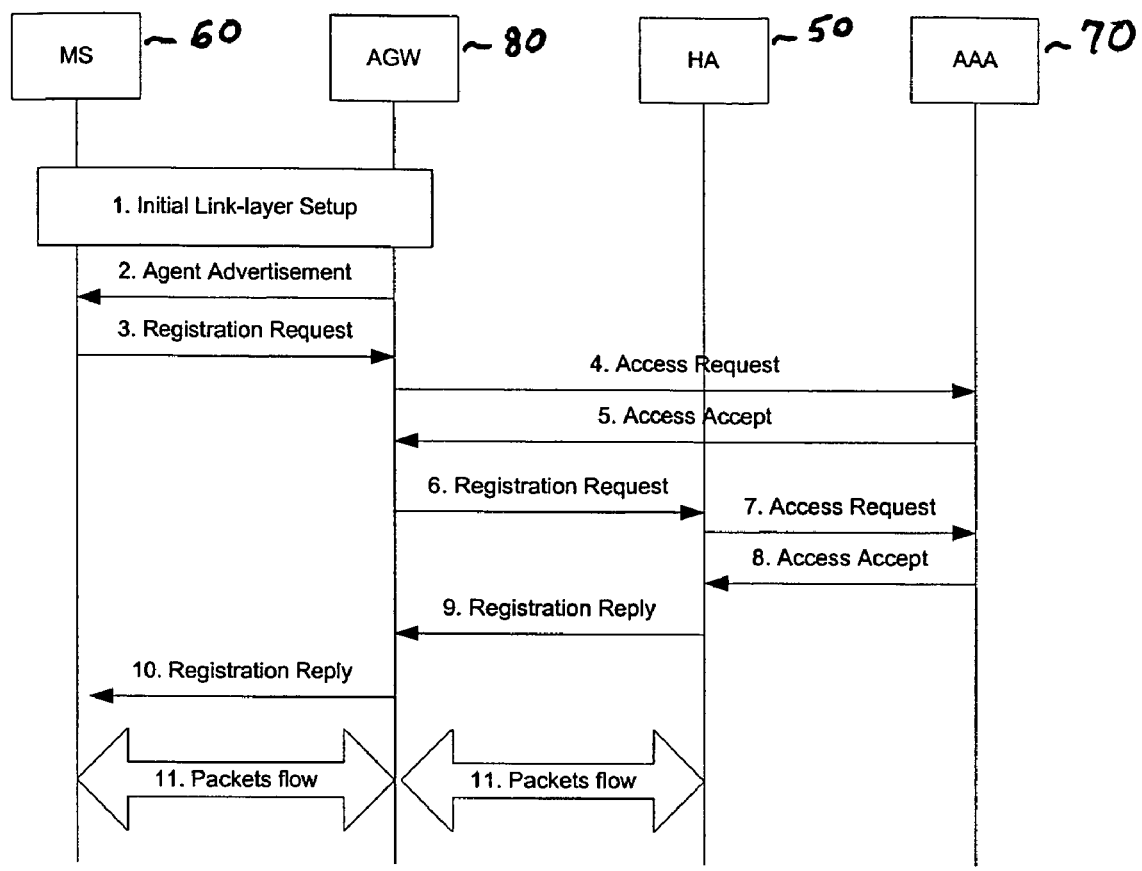
FIG. 5 is a diagram of the signaling messages used in an example procedure for initial establishment of a session for Client Mobile IPv4.

With reference to FIG. 5, we turn now to a method for a Mobile Station configured for Mobile IPv4 to establish a session with the AGW and the HA. The elements shown in the figure correspond to like-numbered elements of preceding figures. Each of the sequentially numbered steps listed below corresponds to a like-numbered block or arrow in the figure.

Initial establishment of a Mobile IPv4 session works just as in the 3GPP2 IS-835 base specification. This allows an unmodified MIPv4 MS to function in the new network. However, during the authentication phase, the AAA subsystem returns a PMN-HA-RK root key to be used for subsequent handoffs. The PMN-HA key is derived from the PMN-HA-RK root key using a pseudo-random function including the IP addresses of the AGW and the HA. Note that the initial registration is conducted according to Mobile IPv4, but subsequent Binding Updates are conducted according to Proxy Mobile IP. The PMN-HA-RK key is passed from the serving AGW to the target AGW during context transfer.

Procedure 4: Proxy Mobile IPv4 Initial Establishment for Mobile IPv4 Mobile Station 1. LCP and IPCP run to bring up the link. During this step, MS 60 leaves out the IP Address option from the IPCP Configure-Request.

2. AGW 80 sends an Agent Advertisement to MS 60 containing a Challenge value.

3. MS 60 forms a Registration Request with the MN-AAA-AE and sends it to AGW 80.

4. The AGW authenticates the Registration Request with the AAA infrastructure 70. The AGW includes an indication that the AGW is Proxy MIP capable.

5. The AAA validates the MN-AAA-AE. The Access Accept is returned to AGW 80 from the AAA infrastructure and contains a PMN-HA-RK root key to be used for subsequent Proxy MIP Registration Requests. The Access Accept also returns the address of a Home Agent (in this example, HA 50) that is Proxy MIP capable.

6. The AGW propagates the RRQ to HA 50.

7. The HA checks the MN-AAA authentication extension with the AAA server 70.

8. An Access Accept is returned from AAA 70 to HA 50 along with the MN-HA key to be used in subsequent MIPv4 RRQ messages and along with a PMN-HA-RK root key to be used in subsequent Proxy MIP messages.

9. HA 50 constructs a Registration Reply and sends it to AGW 80.

10. The AGW sends the Registration Reply to MS 60.

11. Packets flow between MS 60 and HA 50 via AGW 80.

After a P-P context transfer, the routing between the HA and the new AGW needs to be updated. Proxy Mobile IP provides procedures for carrying out the handoff signaling needed to effectuate the binding update during a fast handoff.

Figure 6:
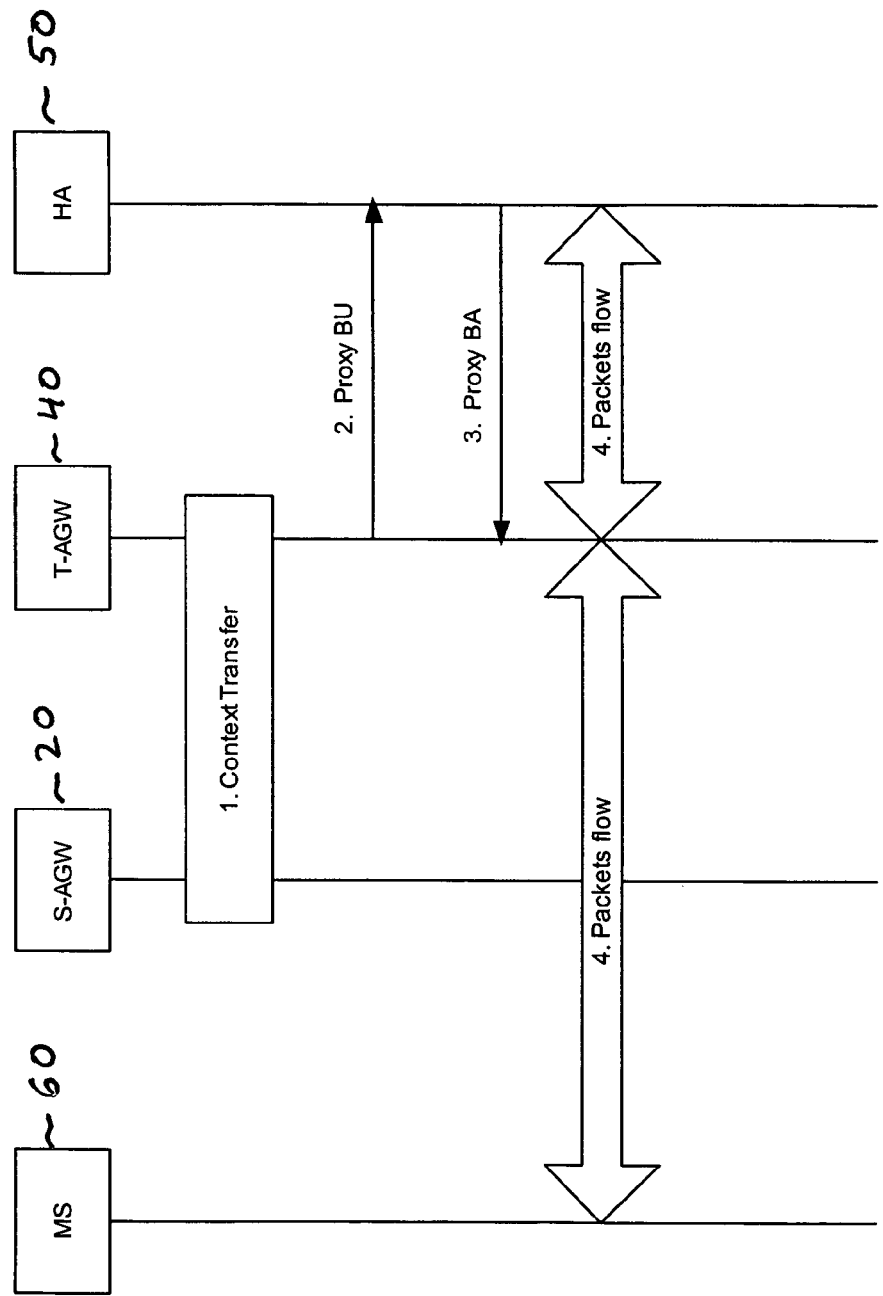
FIG. 6 is a diagram of the signaling messages used in an example procedure for Fast Handoff using Proxy Mobile IPv6.

Accordingly, with reference to FIG. 6, we turn now to a method of fast handoff using Proxy Mobile IPv6. The elements shown in the figure correspond to like-numbered elements of preceding figures. Each of the sequentially numbered steps listed below corresponds to a like-numbered block or arrow in the figure.

Procedure 5: Fast Handoff Using Proxy Mobile IPv6

1. Target AGW 40 performs context transfer from Serving AGW 20. Information provided to Target AGW 40 during the Context Transfer includes the address of HA 50 and also includes the PMN-HA-RK root key (in Mobility and Security Contexts) for use in constructing the Binding Update.

2. The Target AGW computes a PMN-HA session key equal to prf(PMN-HA-RK, AGW IP, HA IP). As explained above, "prf" denotes a pseudo-random function. The Target AGW sends a Proxy Binding Update to the HA address received in step 1. The BU is authenticated using the PMN-HA security association between the Target AGW and the HA. Note that the PMN-HA key that the Target AGW uses is a key derived from the PMN-HA-RK.

3. The HA responds with a Proxy Binding Acknowledgement.

4. Packets flow between MS 60 and HA 50 via Target AGW 40.

Figure 7:
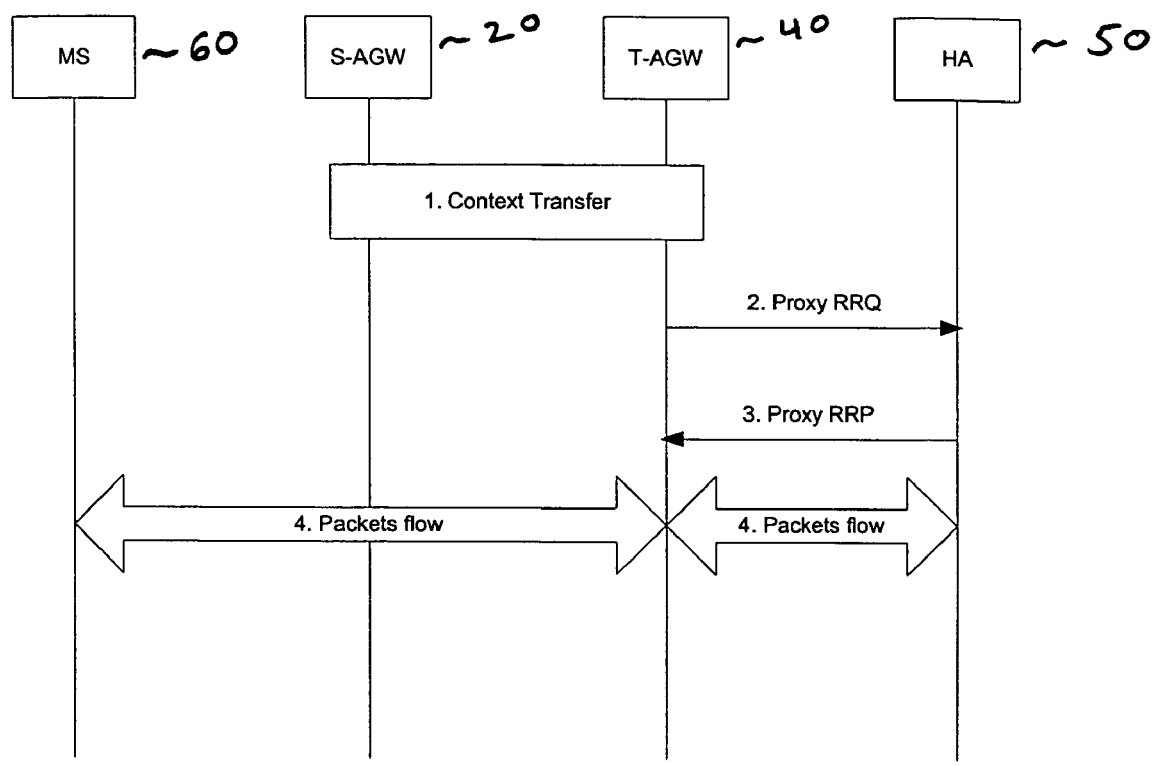
FIG. 7 is a diagram of the signaling messages used in an example procedure for Fast Handoff using Proxy Mobile IPv4.

With reference to FIG. 7, we turn now to a method of fast handoff using Proxy Mobile IPv4. The elements shown in the figure correspond to like-numbered elements of preceding figures. Each of the sequentially numbered steps listed below corresponds to a like-numbered block or arrow in the figure.

Procedure 6: Fast Handoff Using Proxy Mobile IPv4

1. Target AGW 40 performs context transfer from Serving AGW 20. Information provided to Target AGW 40 during the Context Transfer includes the address of HA 50 and also includes the PMN-HA-RK root key (in Mobility and Security Contexts) for use in constructing the Registration Request.

2. The Target AGW computes a PMN-HA session key equal to prf(PMN-HA-RK, AGW IP, HA IP). As explained above, "prf" denotes a pseudo-random function. The Target AGW sends a Proxy Registration Request (RRQ) to the HA address received in step 1. The RRQ is authenticated using the PMN-HA security association between the Target AGW and the HA. Note that the PMN-HA key that the Target AGW uses is a key derived from the PMN-HA-RK.

3. The HA responds with a Registration Reply (RRP).

4. Packets flow between MS 60 and HA 50 via Target AGW 40.

It will be understood that the procedures described above are merely examples, and that our approach is capable of many other specific implementations.

For example, turning back to FIG. 2, the root key PMIP-RK returned by AAA 70 to AGW1 20 can be made a one-time key, to be used only to effectuate the initial binding. For the next binding, HA 50 may devise a new one-time root key, denominated NEXT PMIP-RK, and so on for each subsequent binding. With further reference to FIG. 2, together with PROCEDURE 1, above, HA 50 may return the NEXT PMIP-RK as part of message 7 after the initial AGW1-HA binding has been completed. NEXT PMIP-RK can then be used for the next Binding. At this point both AGW1 20 and HA 50 will replace the PMIP-RK with the NEXT PMIP-RK. When the session gets transferred to AGW2 40, the NEXT PMIP-RK will be sent to AGW2 40 in a context transfer, and AGW2 40 will use it to generate the PMN-HA key and PMN-HA-AE, to be sent in message 12. In message 13, the HA will again return a newly generated NEXT PMIP-RK, and will erase the currently used PMIP-RK. According to such a procedure, the distributed key will be available for only one binding, and the HA will retain control of which AGW possesses the PMIP Root Key at a given time. If the key is sent to an unauthorized or suspected AGW, the NEXT PMIP-RK is not returned to it, and in that event the Mobile IP session will need to be re-authenticated in a procedure that directly involves the Mobile Station.

What is claimed is:

1. A method of establishing a security binding between a home agent and an access gateway on behalf of a served mobile station in a Mobile IP network, comprising:
    obtaining, at the access gateway, an initial root key from an authentication server, wherein the initial root key is used only one time to effectuate an initial security binding;
    computing, at the access gateway, a derivative key, the derivative key computed as a pseudo-random function of (1) the initial root key, (2) an address of the access gateway and (3) an address of an associated home agent;
    requesting, by the access gateway, a binding between the home agent and the access gateway on behalf of the mobile station wherein the derivative key is attached to the binding request for authentication of the request; and
    receiving confirmation at the access gateway from the home agent that the binding request has been validated, wherein confirmation includes a next root key to be used only one time to effectuate a subsequent binding of the mobile station; and
    replacing, at the access gateway, the initial root key with the next root key.

2. A method for validating a binding update for a mobile station in a Mobile IP network, comprising:
    obtaining, at a home agent associated with an access gateway, an initial root key from an authentication server, wherein the initial root key is used only one time to effectuate an initial security binding;
    from the access gateway, obtaining, at the associated home agent, a binding update together with a signature attached to the binding update that has been computed using a derivative key, the derivative key having been constructed as a pseudo-random function of (1) the initial root key, (2) an address of said access gateway and (3) an address of the associated home agent;
    recreating, at the home agent, the derivative key from the pseudo-random function of (1) the initial root key, (2) the address of said access gateway and (3) the address of said home agent;
    using the derivative key to validate the binding update signature;
    generating, at the home agent, a next root key to be used only one time to effectuate a subsequent binding of the mobile station; and
    replacing, at the home agent, the initial root key with the next root key.

3. The method of claim 1, wherein the access gateway is defined as a prior access gateway, the method further comprising:
    Obtaining, at a target access gateway, a transfer of a session context from the prior access gateway, wherein the transferred context includes the next root key;
    using the next root key to compute a derivative key at the target access gateway, the derivative key computed as a pseudo-random function of (1) the next root key, (2) an address of the target access gateway and (3) an address of a home agent associated with the mobile station;
    generating, by the target access gateway, a binding update request on behalf of the mobile station wherein the derivative key is attached to the binding request for authentication of the request;
    sending the signed binding update to the home agent; and
    in response to a validation of the binding update request by the home agent, accepting packets, by the target access gateway, for forwarding between the mobile station and the home agent.

* * * * *